US011778473B2

(12) United States Patent
Samuelsson

(10) Patent No.: US 11,778,473 B2
(45) Date of Patent: Oct. 3, 2023

(54) MOBILE IDENTIFICATION USING THIN CLIENT DEVICES

(71) Applicant: CRUNCHFISH DIGITAL CASH AB, Malmö (SE)

(72) Inventor: Joachim Samuelsson, Helsingborg (SE)

(73) Assignee: CRUNCHFISH DIGITAL CASH AB, Malmö (SE)

(*) Notice: Subject to any disclaimer, the term of this patent is extended or adjusted under 35 U.S.C. 154(b) by 385 days.

(21) Appl. No.: 16/760,948

(22) PCT Filed: Nov. 2, 2018

(86) PCT No.: PCT/SE2018/051120
§ 371 (c)(1),
(2) Date: May 1, 2020

(87) PCT Pub. No.: WO2019/088909
PCT Pub. Date: May 9, 2019

(65) Prior Publication Data
US 2020/0260270 A1 Aug. 13, 2020

(30) Foreign Application Priority Data

Nov. 2, 2017 (SE) .................................. 1751363-1
Dec. 19, 2017 (SE) .................................. 1751576-8

(51) Int. Cl.
*H04L 9/32* (2006.01)
*H04L 9/40* (2022.01)
(Continued)

(52) U.S. Cl.
CPC ............. *H04W 12/47* (2021.01); *H04L 9/321* (2013.01); *H04L 9/3231* (2013.01);
(Continued)

(58) Field of Classification Search
CPC ..... H04W 12/47; H04W 12/69; H04W 12/06; H04W 84/10; H04W 12/068; H04L 9/321;
(Continued)

(56) References Cited

U.S. PATENT DOCUMENTS 9,769,044 B1 * 9/2017 Cirkovic .................. H04L 45/66
10,762,505 B1 * 9/2020 Morris ..................... G06Q 20/36
(Continued)

FOREIGN PATENT DOCUMENTS

| GB | 2519894 A * | 5/2015 | ............. G06F 21/35 |
| GB | 2519894 A | 5/2015 | |
| WO | 2015036957 A1 | 3/2015 | |

OTHER PUBLICATIONS

International Search Report and Written Opinion from related international application No. PCT/SE2018/051120 dated Jan. 24, 2019.

*Primary Examiner* — Trong H Nguyen
(74) *Attorney, Agent, or Firm* — BURR & FORMAN LLP

(57) ABSTRACT

A communication system (100) comprises a thin-client mobile terminal (MT) having a device identity (MT_ID), a thin-client service terminal (ST), and a remote system server resource (SS). The thin-client mobile terminal (MT) is configured for receiving (101) from the service terminal (ST) a short-range wireless communication signal (BA) representing an identification request (ID_REQ), and in response communicating (102) with the remote server resource (SS) by long-range broadband data communication to report the identification request (ID_REQ) as well as the device identity (MT_ID) of the mobile terminal (MT). The remote system server resource (SS) is configured for using the reported device identity (MT_ID) of the mobile terminal (MT) to retrieve (103; 105; 103') identification information
(Continued)

(ID_INFO) about a human person (P) by accessing a storage (192, 192'), and causing communication communication (104; 106) of the retrieved identification information (ID_INFO) to the thin-client service terminal (ST) by long-range broadband data communication.

34 Claims, 5 Drawing Sheets

(51) Int. Cl.
*H04W 12/47* (2021.01)
*H04W 12/69* (2021.01)

(52) U.S. Cl.
CPC ......... *H04L 63/0853* (2013.01); *H04W 12/69* (2021.01); *H04L 2209/80* (2013.01)

(58) Field of Classification Search
CPC ............... H04L 9/3231; H04L 63/0853; H04L 2209/80; H04L 9/3215; H04L 9/3234; H04L 63/18; H04L 63/0876; G06F 21/31; G06F 21/35; G06Q 20/40
See application file for complete search history.

(56) References Cited

U.S. PATENT DOCUMENTS

| | | |
|---|---|---|
| 11,308,481 B1* | 4/2022 | Thomas ........... G06Q 20/40145 |
| 2011/0197267 A1 | 8/2011 | Gravel et al. |
| 2013/0205414 A1* | 8/2013 | Jussila ................. G06Q 20/409 726/30 |
| 2015/0081538 A1* | 3/2015 | Renard .................. G06Q 20/36 705/41 |
| 2017/0105089 A1 | 4/2017 | Brunn et al. |
| 2017/0171200 A1* | 6/2017 | Bao ....................... H04L 9/3213 |
| 2019/0014474 A1* | 1/2019 | Suzuki ............... H04L 63/0876 |
| 2020/0098005 A1* | 3/2020 | Nakayama ............. G06F 13/00 |

\* cited by examiner

MOBILE IDENTIFICATION USING THIN CLIENT DEVICES

TECHNICAL FIELD

The present invention generally relates to mobile identification (m-identification). More specifically, the invention relates to a communication system, method, mobile computing device, computing device and server computing device for performing mobile identification.

BACKGROUND

When a service is to be performed between two parties, there is often a need for one of the parties to verify the identity of the other party. In today's networked digital society, there are various ways of performing online digital identification when a computer or mobile terminal user is to order something from a web shop, perform a financial transaction at an internet bank, submit a digital tax declaration with the tax authorities, etc. For instance, in Sweden, BankID, Mobilt BankID and e-legitimation are three commonly used technologies. Common to all of these technologies is that a) they are performed as online services towards the other party being a network resource (e.g. web site), b) they are triggered by the computer or mobile terminal user or, at least, require active involvement by this user, and c) as part of the authorization procedure, they require the computer or mobile terminal user to input personal identification information such as, for instance, a social security number (personnummer), which is directly linked to the identity of the user.

While these technologies for online user identification certainly have their benefits, they are not designed for use in IRL (in real life) scenarios where two human persons (or one human person and an autonomous service terminal) are at the same physical location and one of the person needs verification of the other person's identity (or the autonomous service terminal needs verification of said one human person's identity). Example situations include release, dispatch, transport, transfer or withdrawal of goods, cash or other valuables.

Further example situations include sale of restricted goods or services (such as, for instance, alcohol, tobacco, vehicles, pharmaceutical drugs, weapons or ammunition), etc.

Other example situations include medical treatment of patients at hospitals, care units, or outside medical facilities, etc.

Still other example situations include identification control by law enforcement, at post offices, banks, courts, police stations, municipalities, authorities, schools and universities, voting election, any type of transportation terminals or vehicles, at public and private facilities, events or protected premises to register entrance, etc.

Yet other example situations include registering loyalty programs at retail merchants, etc., login or registration to use any type of hardware such as computers, machines, vehicles, etc., automated check-in at events, premises, transportation facilities, schools, etc., and controlling access to age-restricted services.

Existing online digital identification technologies are not believed to be suitable for use in IRL situations like the ones exemplified above. One reason is that the procedure would be time-consuming and involve several steps of manual interaction by the persons involved, and certainly at least by the person whose identity is to be verified. This may be a severe drawback in IRL situations where speed is of importance and manual interaction is more complication than when the user uses an online service.

Hitherto, verification of a person's identity has typically involved this person presenting a physical identification item such as an identity card, passport, driver's license, membership card, etc., to another person (or an autonomous service terminal), who would verify the identity of the first person by visual inspection of the physical identification item. One drawback of this approach is that the first person will of course have to remember bringing the physical identification item with him. Another drawback of this approach is that the other person (or autonomous service terminal) will have to rely solely on the physical identification item when making the verification of the first user's identity, and if the physical identification item has been manipulated or falsified, the verification will go wrong.

Even if one hypothetically imagines a computerized version of the above, where the first person would use a mobile device to retrieve a digital representation of an identification item from a network service, or from local memory, and present it on a display screen of the mobile device to the second person (or autonomous service terminal), this would still suffer from drawbacks in terms of speediness and reliability of the identification procedure.

As is clear from the above description, the present inventor has identified problems and shortcomings with the prior art. In line with the observations above, the present inventor has identified both the need for and the benefits of mobile digital identification in IRL scenarios where two human persons (or one person and an autonomous service terminal) are at the same physical location and one of the persons (or the autonomous service terminal) needs to verify the (other) person's identity.

SUMMARY

It is accordingly an object of the invention to solve, eliminate, alleviate, mitigate or reduce at least some of the problems and shortcomings referred to above.

A first aspect of the present invention is a communication system comprising a thin-client mobile terminal having a device identity, a thin-client service terminal, and a remote system server resource. The thin-client mobile terminal is configured for receiving from the service terminal a short-range wireless communication signal representing an identification request, and in response communicating with the remote server resource by long-range broadband data communication to report the identification request as well as the device identity of the mobile terminal. The remote system server resource is configured for using the reported device identity of the mobile terminal to retrieve identification information about a human person by accessing a storage, and causing communication of the retrieved identification information to the thin-client service terminal by long-range broadband data communication.

Hence, a communication system for performing mobile identification (m-identification) in a novel and inventive way is provided.

A second inventive aspect is a method for performing mobile identification, the method involving:

receiving by a thin-client mobile terminal from a thin-client service terminal a short-range wireless communication signal representing an identification request;

in response communicating with a remote server resource by long-range broadband data communication to report the identification request as well as a device identity of the mobile terminal;

retrieving identification information about a human person by accessing a storage using the reported device identity of the mobile terminal; and causing communication of the retrieved identification information to the thin-client service terminal by long-range broadband data communication.

Hence, a method for performing mobile identification in a novel and inventive way is provided.

The method for performing mobile identification according to the second inventive aspect may additionally involve any of the functional features defined in this document for the different alternatives and embodiments of the communication system according to the first inventive aspect.

A third inventive aspect is a mobile computing device comprising a memory for storing an identity associated with the mobile computing device, a controller, a short-range wireless communication interface, and a long-range broadband communication interface. The controller is configured for performing the functionality defined for the thin-client mobile terminal in the communication system according to the first inventive aspect, and/or the functionality defined for the thin-client mobile terminal in the method for performing mobile identification according to the second inventive aspect.

A fourth inventive aspect is a computing device comprising a controller, a short-range wireless communication interface, and a long-range broadband communication interface. The controller is configured for performing the functionality defined for the thin-client service terminal in the communication system according to the first inventive aspect, and/or the functionality defined for the thin-client service terminal in the method for performing mobile identification according to the second inventive aspect.

A fifth inventive aspect is a server computing device configured for performing the functionality defined for the remote system server resource in the communication system according to the first inventive aspect, and/or the functionality defined for the remote system server resource in the method for performing mobile identification according to the second inventive aspect.

The thin-client mobile terminal and thin-client service terminal are "thin clients" in the sense that there is no need for them to communicate directly with each other (except for the short-range wireless communication signal which represents an identification request); instead they communicate with the remote system server resource by long-range broadband data communication. No other limitations are intended by the prefix "thin-client".

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
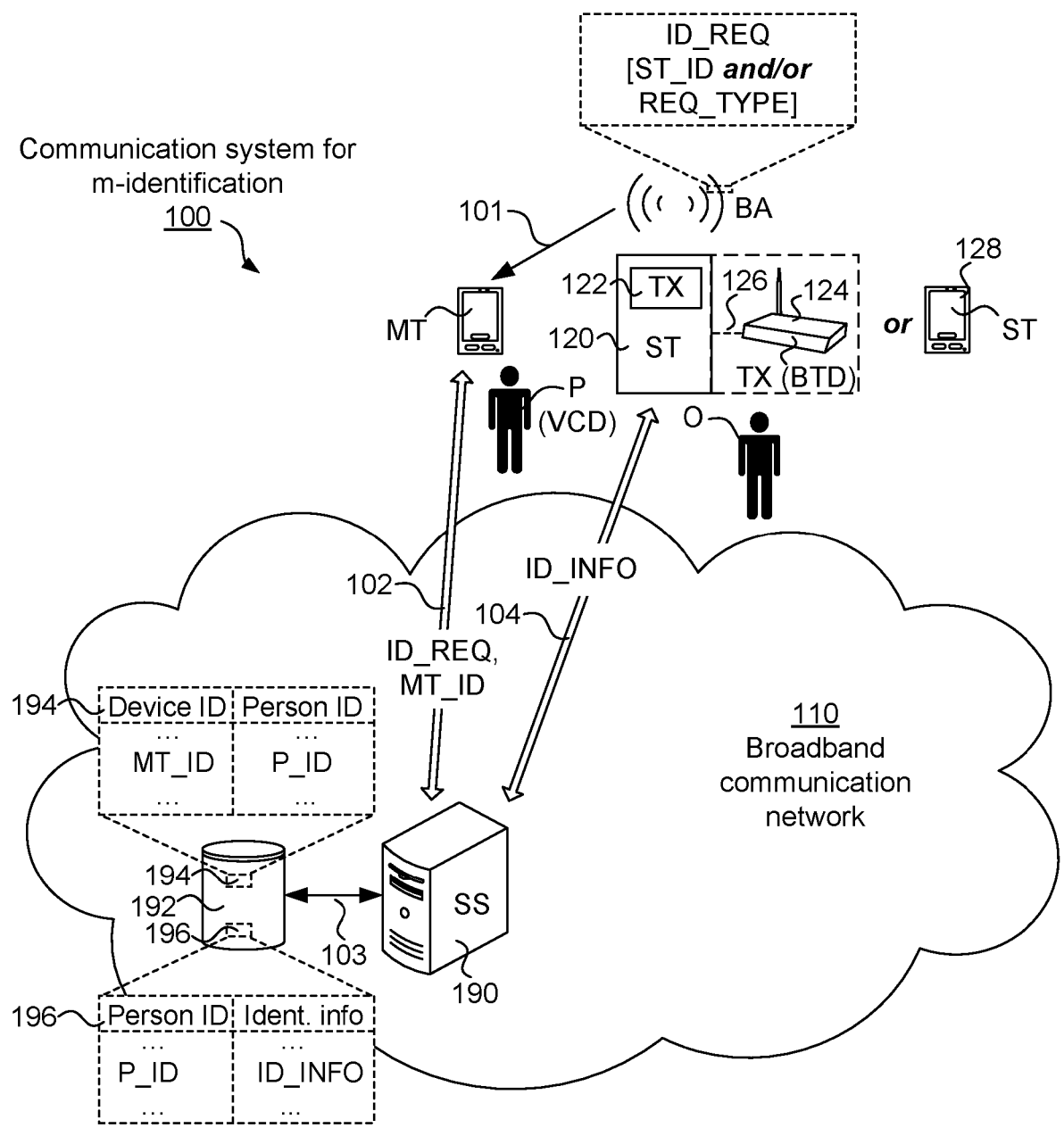
FIG. 1 illustrates an embodiment of a communication system configured for performing mobile identification using thin client devices.

Reference is first made to FIG. 1 which illustrates a communication system 100 generally according to the present invention. As can be seen in FIG. 1, the communication system 100 comprises a thin-client mobile terminal MT having a device identity MT_ID, a thin-client service terminal ST, and a remote system server resource SS. As can also be seen in FIG. 1, a user P of the thin-client mobile terminal MT may approach the thin-client service terminal ST at a service point. The service terminal ST may be manually operated by a human person, referred to as operator O in this document. Alternatively, the service terminal ST may operate autonomously without needing a human person to operate it.

The service terminal may be stationary (i.e., designed and configured to remain at the service point at the same physical position), as can be seen at 120 in FIG. 1. In some embodiments, the thin-client service terminal ST may instead be mobile as well. This can be seen at 128 in FIG. 1. In such cases, it may be that an operator O of the service terminal ST approaches the user P and the thin-client mobile terminal MT with the service terminal ST, or the other way around like when the service terminal is stationary 120; the service point will hence not be at one and the same physical position but instead be defined as the current location of the mobile service terminal ST 128.

Advantageous ways of performing mobile identification of the user (human person) P of the mobile terminal MT to the service terminal ST/its operator O of will now be described. The reason for the mobile identification may be that the service terminal ST/its operator O needs to verify the true identity of the user in order to perform some kind of service. The service may, for instance and without limitation, involve:

Release, dispatch, transport, transfer or withdrawal of goods, cash or other valuables, etc.

Sale of restricted goods or services (such as, for instance, alcohol, tobacco, vehicles, pharmaceutical drugs, weapons or ammunition), etc.

Medical treatment of patients at hospitals, care units, or outside medical facilities, etc.

Identification control by law enforcement, at post offices, banks, courts, police stations, municipalities, authorities, schools and universities, voting election, any type of transportation terminals or vehicles, at public and private facilities, events or protected premises to register entrance, etc.

Registering loyalty programs at retail merchants, etc.

Login or registration to use any type of hardware such as computers, machines, vehicles, etc.

Automated check-in at events, premises, transportation facilities, schools, etc.

Controlling access to age-restricted services

A similar reason may be that the service terminal ST//its operator O needs to verify a property, capability or asset of the user P in order to perform some kind of service. Such service may, for instance and without limitation, involve:

Verification of driver's license, passport, visa, membership, valid ticket possession, library admittance, gym admittance, entrance admittance to protected premises, payment authorization, credit facilities, etc.

As can be seen in FIG. 1, the service terminal ST has a transmitter function TX for transmitting a short-range wireless communication signal BA which represents an identification request ID_REQ. The skilled person will understand that depending on implementation, the transmitter function TX may be implemented by short-range wireless communication circuitry comprised in the service terminal ST itself in some embodiments, as is seen at 122 in FIG. 1 (also see for instance short-range wireless communication interface 176 in computing device 170 in FIG. 4). This will typically also be the case when the service terminal ST is a mobile terminal as seen at 128 in FIG. 1. In other embodiments, the transmitter function TX may be a separate transmitter device being positioned external to but physically near the service terminal ST, as seen at 124 in FIG. 1. "Physically near" may include the transmitter device TX 124 being mounted at ceiling level or floor level. The separate transmitter device TX 124 may be connected to the service terminal ST, as seen at 126 in FIG. 1, or it may operate as an autonomous device.

The thin-client mobile terminal MT is configured for receiving from the service terminal ST the short-range wireless communication signal BA which represents the identification request ID_REQ. This can be seen at 101 in FIG. 1. The skilled person will notice that "the thin-client mobile terminal MT . . . receiving from the service terminal ST" means receiving the short-range wireless communication signal BA as transmitted by the transmitter function TX of the service terminal ST. Hence, in embodiments where the transmitter function TX is separate 124 from the service terminal ST, "the thin-client mobile terminal MT . . . receiving from the service terminal ST" means receiving the short-range wireless communication signal BA from the separate transmitter function TX 124 which is positioned external to but physically near the service terminal ST.

In response to receiving 101 the short-range wireless communication signal BA, the thin-client mobile terminal MT is configured for communicating 102 with the remote server resource SS by long-range broadband data communication to report the identification request ID_REQ as well as the device identity MT_ID of the mobile terminal MT. The device identity MT_ID associated with the mobile terminal MT may generally be any identity sufficient to identify the mobile terminal MT. Hence, the device identity MT_ID may be a hardware-based device-specific identity such as a MAC address, Bluetooth ID or an IMEI number. It may alternatively be a firmware-based or software-based device-specific identity. Alternatively, it may be a device-specific identity stored on a data carrier readable by the mobile terminal MT, such as for instance an IMSI number.

As can be seen in FIG. 1, the remote system server resource SS is configured for using the reported device identity MT_ID of the mobile terminal MT to retrieve 103 identification information ID_INFO about the human person P by accessing a storage 192. The remote system server resource SS is furthermore configured for causing communication 104 of the retrieved identification information ID_INFO to the thin-client service terminal ST by long-range broadband data communication.

This identification procedure is advantageous for several reasons.

For instance, it can be implemented efficiently in terms of speed, such that the identification procedure is performed and completed in a time short enough not to be disturbing to the user P (and operator O when applicable).

Another advantage is that it can be implemented without requiring manual interaction from the user P, or at least only limited interaction (for examples of such limited interaction, please refer to the later sections in this document concerning verification control data for the user P).

Moreover, there is an improvement in reliability or integrity of the identification, since the identification procedure is initiated from the service terminal ST side rather than from the user P to be identified, and since the results of the identification procedure (the retrieved identification information ID_INFO) are communicated to the service terminal ST rather than the mobile terminal MT of the user P. Hence, the risk of manipulation by the user P is substantially reduced.

The storage 192 may contain a mapping 194 between device identities and human person identities. The remote system server resource SS may be configured for using the mapping 194 to determine a person identity P_ID in the storage 192 which matches the reported device identity MT_ID of the mobile terminal MT. Moreover, the remote system server resource SS may be configured for using the determined person identity P_ID to retrieve the identification information ID_INFO about the human person P.

In one embodiment, illustrated in FIG. 1, the storage 192 is associated with the remote server resource SS. In addition to the mapping 194, the storage 192 furthermore stores a data structure 196 which contains identification information for various human persons, including the identification information ID_INFO about the human person P. The remote system server resource SS is configured for retrieving 103 the identification information ID_INFO about the human person P from the data structure 196 by using the determined person identity P_ID to query the data structure 196 in the storage 192.

When the identification information ID_INFO has been retrieved by the remote server resource SS in this way, the remote server resource SS will communicate 104 the retrieved identification information ID_INFO to the thin-client service terminal ST by long-range broadband data communication, as previously described and as seen at 104 in FIG. 1.

In another embodiment, the storage 192 is still associated with the remote server resource SS, but the communication system 100 furthermore comprises one or more additional remote server resources SS', SS". This can be seen in FIG. 2. The remote server resource SS is configured for retrieving 105 the identification information ID_INFO about the human person P from one of the additional remote server resources SS', SS" using the determined person identity P_ID as retrieved from the storage 192.

To this end, each additional remote server resource SS', SS" may have an associated storage 192' for storing a data structure 196', which contains identification information for various human persons, including the identification information ID_INFO about the human person P. Again, this can be seen in FIG. 2. Hence, data structure 196' in FIG. 2 is functionally equivalent to data structure 196 in FIG. 1 and can be queried by using the determined person identity P_ID.

Figure 2:
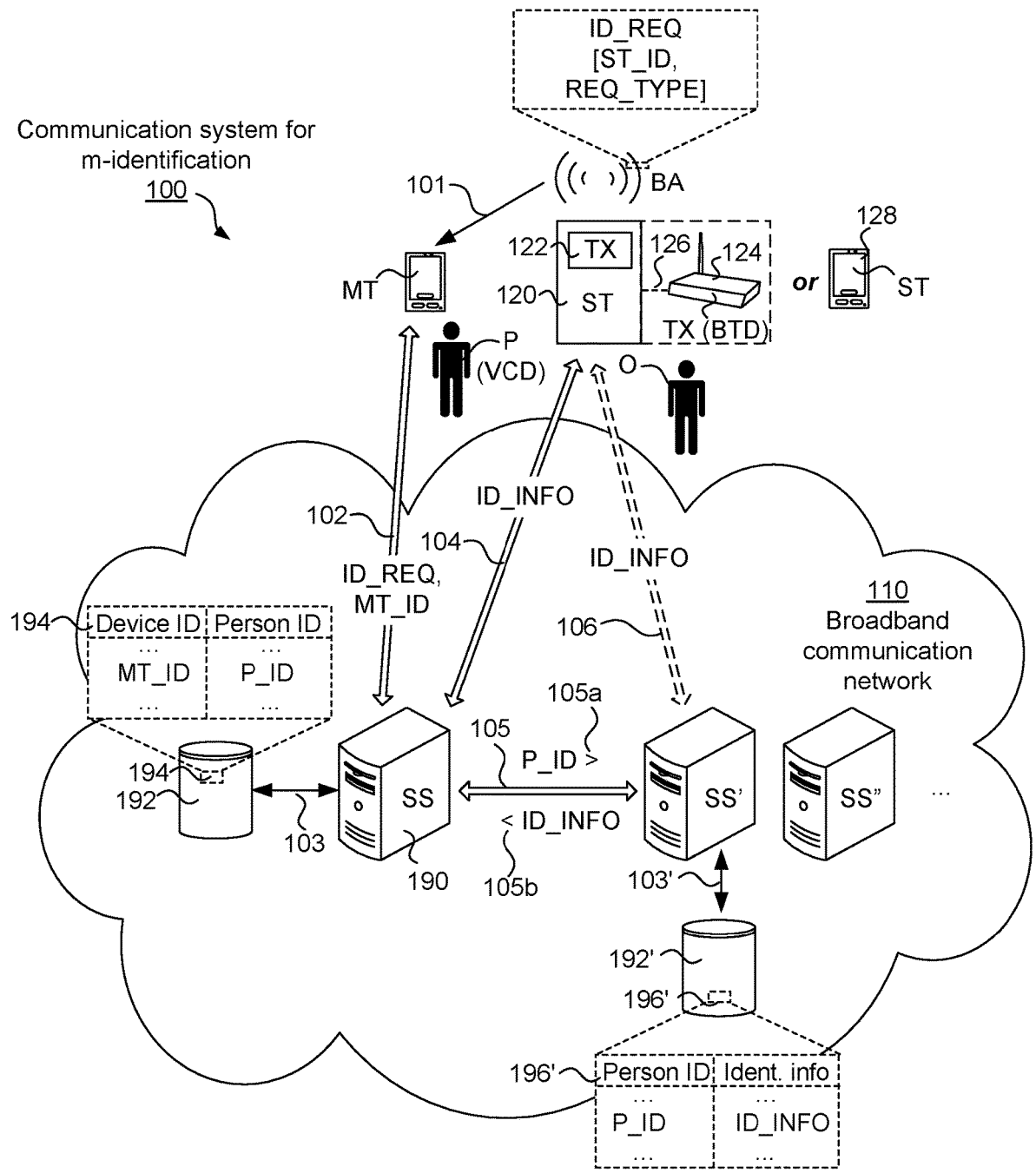
FIG. 2 illustrates another embodiment of the communication system configured for performing mobile identification using thin client devices.

As seen at 105*a* in FIG. 2, the remote system server resource SS sends a request to the additional remote server resource SS' for retrieving the identification information ID_INFO about the human person P from the data structure 196'. The request contains the determined person identity P_ID. As can be seen at 103' in FIG. 2, the additional remote server resource SS' uses the person identity P_ID to retrieve the identification information ID_INFO about the human person P from the data structure 196', and then responds to the remote system server resource SS at 105*b* by providing the retrieved identification information ID_INFO.

When the identification information ID_INFO has been responded to the remote server resource SS in this way, the remote server resource SS will communicate 104 the retrieved identification information ID_INFO to the thin-client service terminal ST by long-range broadband data communication, as previously described and as seen at 104 in FIG. 2.

Hence, in this embodiment, the remote server resource SS is configured for requesting 105*a* the additional remote server resource SS' to retrieve the identification information ID_INFO about the human person P, the request including the determined person identity P_ID. The additional remote server resource SS' is configured for using the determined person identity P_ID to retrieve 103' the identification information ID_INFO about the human person P from the data structure 196' associated with the additional remote server resource SS', and responding 105*b* to the remote system server resource SS by providing the retrieved identification information ID_INFO. Finally, the remote server resource SS is configured for communicating 104 the retrieved identification information ID_INFO to the thin-client service terminal ST by long-range broadband data communication.

Alternatively, the additional remote server resource SS' may itself take care of the communication of the retrieved identification information ID_INFO to the thin-client service terminal ST. This can be seen at 106 in FIG. 2. In this alternative, the remote server resource SS may provide sufficient address information for broadband data communication with the service terminal ST in the request 105*a*.

Accordingly, in this alternative, the remote server resource SS is configured for requesting 105*a* the additional remote server resource SS' to retrieve the identification information ID_INFO about the human person P, the request including the determined person identity P_ID. The additional remote server resource SS' is configured for using the determined person identity P_ID to retrieve 103' the identification information ID_INFO about the human person P from the data structure 196' associated with the additional remote server resource SS', and communicating 106 the retrieved identification information ID_INFO to the thin-client service terminal ST by long-range broadband data communication. The identification request ID_REQ represented by the short-range wireless communication signal BA from the (transmitter function TX of the) service terminal ST may advantageously contain an identity ST_ID associated with the service terminal ST. In some embodiments, it is the identity ST_ID per se that constitutes the identification request ID_REQ. Additionally or alternatively, the identification request ID_REQ may contain data REQ_TYPE specifying a type of identification requested.

The identity ST_ID associated with the service terminal ST may be used by the remote server resource SS to determine sufficient address information about the intended receiver (i.e., the service terminal ST) of the retrieved identification information ID_INFO for the broadband data communication 104 or 106. Such address information may, for instance, comprise an IP address, an URL or an URI.

Embodiments might be possible where the identification request ID_REQ as such does not contain an identity associated with the service terminal ST. In such cases, the identification request ID_REQ at least contain some data to allow the remote server resource SS (or additional remote server resource SS') to determine sufficient address information for the broadband data communication 104 (or 106) with the intended receiver (i.e., the service terminal ST).

The data REQ_TYPE specifying the type of identification requested may be used by the remote server resource SS (or additional remote server resource SS') to determine what contents to retrieve and include in the identification information to be communicated at 104 (or 106) to the thin-client service terminal ST. In embodiments which include the aforementioned one or more additional remote server resources SS', SS", the data REQ_TYPE specifying the type of identification requested will allow the remote server resource SS to decide which of the additional remote server resources SS', SS" to retrieve 105, 103' the identification information ID_INFO about the human person P from.

For embodiments where the identification request ID_REQ does not contain any data REQ_TYPE specifying the type of identification requested, the identity ST_ID associated with the service terminal ST may be used by the remote server resource SS (or additional remote server resource SS') to determine what contents to retrieve and include in the identification information to be communicated at 104 (or 106) to the thin-client service terminal ST.

Non-limiting examples of identification information ID_INFO provided according to embodiments of the present invention are:
1. Information verifying the true identity of the person P, such as identification card (photo ID) information, passport information or driver's license information. The information may be held by the remote server resource SS or additional remote server resource SS', SS" as a trusted authority, such as a bank or governmental organization.
2. Information verifying a property, capability or asset of the person P, such as driver's license information, membership information, valid ticket possession information, library card information, gym card information, entrance access card information, etc. The information may be held by the remote server resource SS or additional remote server resource SS', SS" as a trusted authority, such as a bank or governmental organization, or a private company being the issuer, provider, distributor or administrator of the property, capability or asset of the person P in question.

Figure 4:
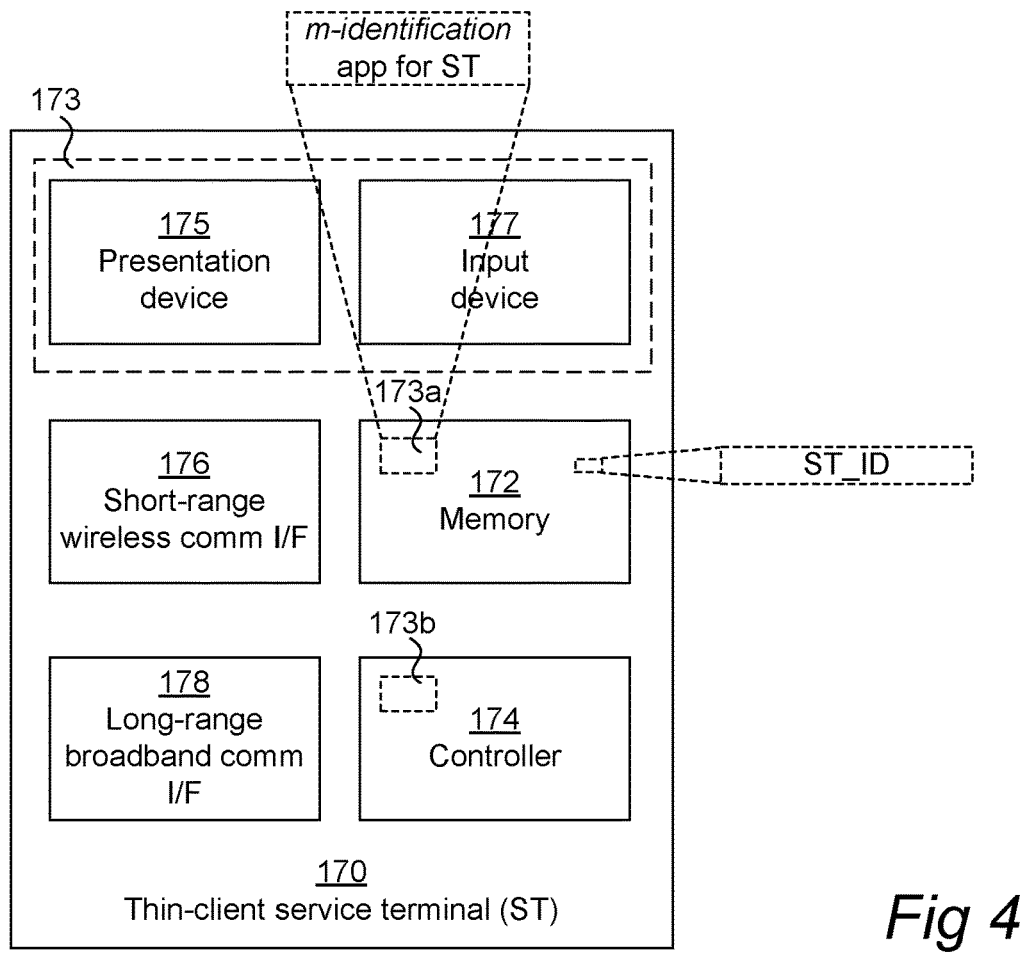
FIG. 4 illustrates another such device in the form of a computing device implementing a thin-client service terminal.

The identification information ID_INFO may be delivered to the thin-client service terminal ST in any digital format suitable for its intended use. The intended use may typically involve presenting the identification information ID_INFO in a user interface 173 of the thin-client service terminal ST. As can be seen in FIG. 4, the user interface 173 may include a presentation device 175 and an input device 177 to this end.

It is to be emphasized that in the communication system 100, there is no need for transfer of data related to the mobile identification over short-range wireless communication from the thin-client mobile terminal MT to the thin-client service terminal ST.

It is to be emphasized that the mobile identification functionality of the present invention is based on physical proximity between the mobile terminal MT and the service terminal ST. Hence, the communication system 100 is preferably configured such that the mobile terminal MT will only receive 101, or at least only react upon, the short-range wireless communication signal BA from the service terminal ST when the mobile terminal MT is physically near the service terminal ST. This will decrease the risk of false activation of the mobile terminal MT and prevent undesired activation of other signal receiving devices in the neighborhood.

This may be done in different ways. One way is for the service terminal ST to use a low transmission power for the short-range wireless communication signal BA, such that it can only be received when the mobile terminal MT is physically very near the service terminal ST.

Another way is to configure the mobile terminal MT such that it checks the received signal strength of the short-range wireless communication signal BA and based thereon makes a decision whether or not it is sufficiently near the service terminal ST. This notion may be referred to as ranging.

The above notwithstanding, there may be useful situations where it is instead desired to activate more than one mobile terminal MT in the neighborhood of the service terminal ST. Possible use cases include, for instance, the checking of valid tickets at public transportation or events.

In an advantageous embodiment, the transmitter function TX of the thin-client service terminal ST is a beacon transmitter device BTD which is included in or implemented by the thin-client service terminal ST itself, or alternatively is connected with or at least located spatially close to the thin-client service terminal ST. The beacon transmitter device BTD is configured for repetitive transmission of a short-range wireless beacon signal BA (also known as a beacon advertisement signal) that implements the short-range wireless communication signal BA which represents the identification request ID_REQ.

More specifically, in this advantageous embodiment, the thin-client mobile terminal MT may be configured for storing, in a memory 152 of the mobile terminal MT, one or more predefined service terminal identities ST_ID 1 . . . ST_ID n. This can be seen in FIG. 3. The thin-client mobile terminal MT may also be configured for receiving 101 the short-range wireless communication signal BA which represents the identification request ID_REQ by monitoring for short-range wireless beacons signals containing any of the predefined service terminal identities ST_ID 1 . . . ST_ID n.

The beacon transmitter device BTD may for instance be compliant with Apple iBeacon. It may be compliant with or based on the Bluetooth Low Energy, BLE, standard, and more particularly on Generic Access Profile, GAP, advertising packets. Accordingly, the short-range wireless beacon signal will be transmitted in a 31-byte GAP BLE packet. Alternatively, other kinds of short-range wireless beacon technologies, for instance AltBeacon, URIBeacon and Eddystone, may implement the beacon transmitter device BTD.

In some beacon implementations, the beacon receivers may be in active mode as well as passive mode. For further details about passive and active beacon receivers, reference is made to the following patent applications by the present applicant, the respective contents of which are incorporated herein by reference in their entirety: SE 1551329-4 "IMPROVED ABILITY TO DETECT PASSIVE BEACON RECEIVER DEVICES IN A SHORT-RANGE WIRELESS BEACON COMMUNICATION SYSTEM", SE 1551516-6 "IMPROVED ABILITY TO INTERACT WITH PASSIVE BEACON RECEIVER DEVICES IN A SHORT-RANGE WIRELESS BEACON COMMUNICATION SYSTEM", SE 1551557-0 "IMPROVED METHOD OF PROVIDING A SERVICE BY A SERVICE TERMINAL TO A USER OF A MOBILE DEVICE, AND AN ASSOCIATED COMMUNICATION SYSTEM", SE 1651738-5 "IMPROVED ABILITY TO TRIGGER BEACON RECEIVER DEVICES IN A SHORT-RANGE WIRELESS BEACON COMMUNICATION SYSTEM", and SE 1751432-4 "EARLY ACTIVATION OF MOBILE DEVICE TO ENABLE USE AT SERVICE TERMINAL".

In embodiments where the mobile terminal MT is a beacon receiver, it may advantageously be configured such that its user P may use it for performing mobile identification even when it is in passive mode. A mobile identification app or functionality in the mobile terminal MT may be capable to perform some activity during a certain time window (for instance 10-180 seconds) after the detection of the short-range wireless communication signal BA, even when the mobile terminal MT is in passive mode. This means that the identification procedure may be performed very fast and without requiring the user P to even hold the mobile terminal MT in his hands. In some embodiments, however, the passive mode activity may also include detecting an interaction for user verification purposes as described above.

Needless to say, the mobile terminal MT will be capable of doing mobile identification also when it is in active mode, still allowing a very fast identification procedure.

Alternatively, the short-range wireless communication signal BA which represents the identification request ID_REQ and is received by the thin-client mobile terminal MT may be a near-field communication, NFC, signal, a radio frequency identification, RFID, signal, a Bluetooth signal, a wireless LAN signal, or another form of proximity-based, device-to-device radio communication signal, such as an LTE Direct signal.

Advantageously, the broadband data communication as referred to in this document involves encrypted/secure IP communication. The broadband data communication referred to in this document for the thin-client mobile terminal MT may, for instance, be compliant with WCDMA, HSPA, GSM, UTRAN, UMTS, LTE or LTE Advanced. The broadband data communication referred to in this document for the thin-client service terminal ST may, for instance, be compliant with WCDMA, HSPA, GSM, UTRAN, UMTS, LTE or LTE Advanced, or alternatively wired data communication based, for instance, on TCP/IP.

In some embodiments, verification control data provided by the user P of the mobile terminal T may be required in order to protect the personal integrity of the user P, and/or in order to enhance the reliability of the verification of the identity of the user P from the perspective of the operator O of the service terminal ST. The verification control data may comprise a passcode entered by the user P, such as a PIN code, password or personal information (such as a social security number or personnummer), or it may comprise a biometric sample, such as a fingerprint, iris scan, face scan or voice sample, or a combination thereof.

To this end, the thin-client service terminal ST may have a user interface 173 including a presentation device 175 and an input device 177. One embodiment of a computing device 170 which may implement such a service terminal ST is shown in FIG. 4 and described in more detail in a later section of this document. The thin-client service terminal ST may be configured for receiving, by the input device 177, a user input from the user P of the thin-client mobile terminal MT, wherein the user input comprises verification control data VCD. The thin-client service terminal ST may further be configured for communicating the received verification control data VCD to the remote system server resource SS by long-range broadband data communication. This may, for instance, be done in the communication step 102 in FIGS. 1 and 2, or alternatively as a separate communication step.

The remote system server resource SS may be configured for causing verification of the received verification control data VCD, and only when the verification is successful causing communication 104; 106 of the retrieved identification information ID_INFO to the thin-client service terminal ST by long-range broadband data communication.

Advantageously, the remote system server resource SS may be configured for causing verification of the received verification control data VCD by using the reported identity MT_ID associated with the mobile terminal MT or, alternatively, the determined person identity P_ID, to retrieve verification reference data from a storage (such as storage 192), and causing comparison between the received verification control data VCD and the retrieved verification reference data. The comparison may be done by the remote system server resource SS itself, or by requesting a validation service from an external resource.

In other words, identification information ID_INFO pertaining to the user P (as identified by the device identity MT_ID of his mobile terminal MT) will be delivered to the service terminal ST only when there is a match between MT_ID and P_ID and in addition there is also a match between the verification control data VCD provided by the user P and the verification reference data as retrieved by the remote system server resource SS. From the perspective of the operator O of the service terminal ST, this beneficially means that any identification information ID_INFO actually received from the remote system server resource SS should be considered as highly trustworthy.

In alternative but advantageous embodiments, user interaction (e.g. user verification) as a requisite for causing performance of the mobile identification may be made at the mobile terminal MT side, instead of at the service terminal ST side as with some embodiments described above.

To this end, after having received 101 the short-range wireless communication signal BA, the mobile terminal MT may be configured to detect an interaction by the user P and verify that the interaction corresponds to a predefined actuation of the mobile terminal MT. The mobile terminal MT may moreover be configured to proceed with the step of communicating 102 with the remote server resource SS by long-range broadband data communication to report the identification request ID_REQ as well as the device identity MT_ID of the mobile terminal MT only when it has been verified that the interaction corresponds to the predefined actuation. Otherwise, the mobile terminal MT will not make the communication 102, and no identification information ID_INFO will be retrieved by the remote system server resource SS.

The interaction may, for instance but not limited to, be any of the following:
- a predefined actuation of the mobile terminal MT in the form of a touch display swipe, a touch display swipe pattern, entry of a passcode, a fingerprint scan, a face scan, an iris scan, a voice sample, a keypress sequence, etc, for instance in the form of an unlock command,
- a predefined actuation of the mobile terminal MT in the form of invoking a certain app or functionality in the mobile terminal MT (such as pressing a button to start a camera app or functionality),
- a predefined actuation of the mobile terminal MT in the form of subjecting it to a certain movement such as shaking or turning/tilting it.
- a predefined actuation of the mobile terminal MT in the form of entry of verification control data VCD (such as entry of a passcode (e.g. PIN code or password) or a biometric sample (e.g. a fingerprint scan, a face scan or an iris scan).

Alternatively, the mobile terminal MT may be configured, after having received 101 the short-range wireless communication signal BA, to receive an entry from the user P of the thin-client mobile terminal MT, wherein the entry comprises verification control data VCD, and communicate the received verification control data VCD to the remote system server resource SS by long-range broadband data communication. The remote system server resource SS may be configured to cause verification of the received verification control data VCD, and cause communication 104; 106 of the retrieved identification information ID_INFO to the thin-client service terminal ST by long-range broadband data communication only when the verification is successful.

Advantageously, the remote system server resource SS may be configured for causing verification of the received verification control data VCD by using the reported identity MT_ID associated with the mobile terminal MT or, alternatively, the determined person identity P_ID, to retrieve verification reference data from a storage (such as storage 192), and causing comparison between the received verification control data VCD and the retrieved verification reference data. The comparison may be done by the remote system server resource SS itself, or by requesting a validation service from an external resource.

User verification at the mobile terminal MT side may be particularly beneficial for embodiments where the short-range wireless communication signal BA is a short-range wireless beacon signal transmitted by a beacon transmitter device BTD, as previously described above.

A method for performing mobile identification will now be described with reference to FIG. 6. A first step 310 involves receiving by a thin-client mobile terminal MT from a thin-client service terminal ST a short-range wireless communication signal BA representing an identification request ID_REQ. This corresponds to 101 in FIGS. 1 and 2.

A second step 320 in response involves communicating with a remote server resource SS by long-range broadband data communication to report the identification request ID_REQ as well as a device identity MT_ID of the mobile terminal MT. This corresponds to 102 in FIGS. 1 and 2.

A third step 330 involves retrieving identification information ID_INFO about a human person P by accessing a storage 192, 192' using the reported device identity MT_ID of the mobile terminal MT. This corresponds to 103; 105; 103' in FIGS. 1 and 2.

A fourth step 340 involves causing communication of the retrieved identification information ID_INFO to the thin-client service terminal ST by long-range broadband data communication. This corresponds to 104, 106 in FIGS. 1 and 2.

Figure 6:
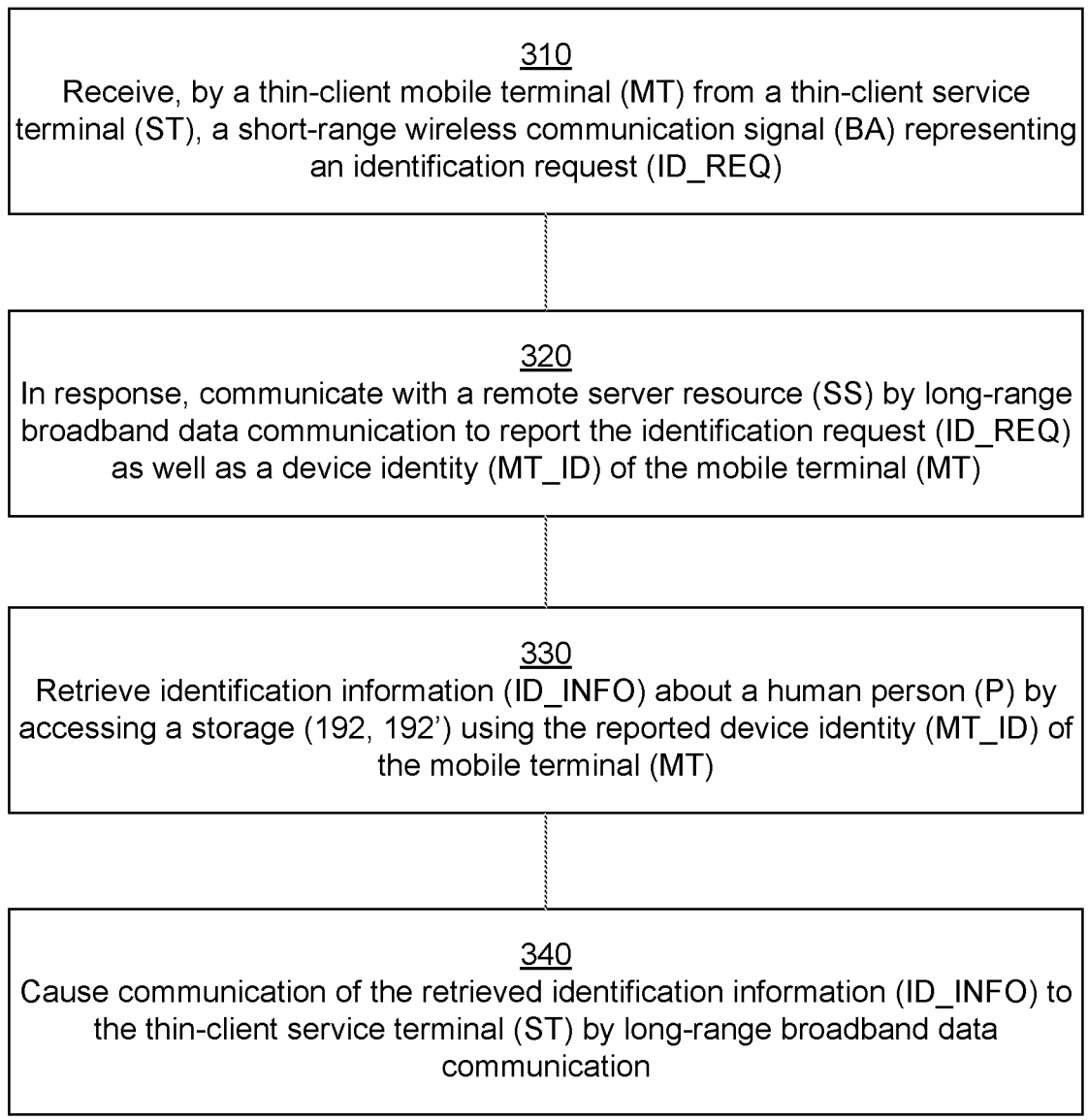
FIG. 6 illustrates a method for performing mobile identification.

The method for performing mobile identification in FIG. 6 may additionally involve any of the functional features defined above for the different alternatives and embodiments of the communication system 100 according to FIG. 1 and/or FIG. 2.

Figure 3:
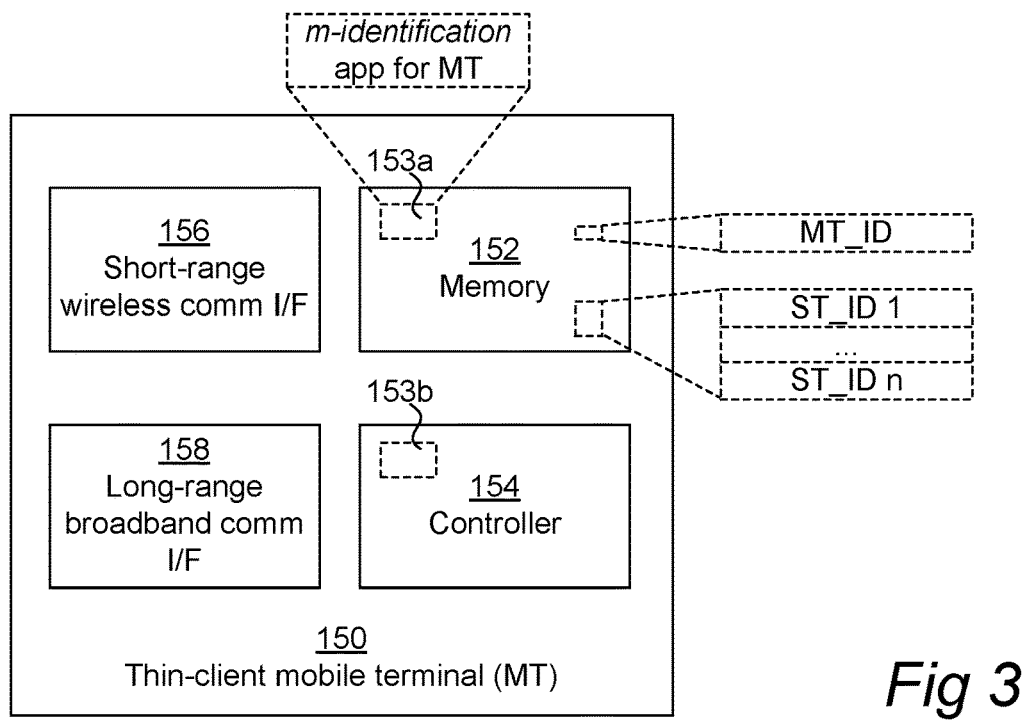
FIG. 3 illustrates one such device in the form of a mobile computing device implementing a thin-client mobile terminal.

FIG. 3 illustrates a mobile computing device 150 which may implement the thin-client mobile terminal MT as described herein. The mobile computing device 150 comprises a memory 152 for storing the identity MT_ID associated with the mobile computing device MT. The mobile computing device 150 also comprises a controller 154, a short-range wireless communication interface 156, and a long-range broadband communication interface 158. The controller 154 is configured for performing the functionality defined for the thin-client mobile terminal MT in the communication system 100 as described herein, and/or the functionality defined for the thin-client mobile terminal MT in the method for performing mobile identification according to FIG. 6.

The mobile computing device 150 illustrated in FIG. 3 may, for instance, be a mobile phone, tablet computer, personal digital assistant, smart glasses, smart watch or smart bracelet. The controller 154 may be a processing unit in the form of, for instance, one or more microcontrollers, CPUs and/or DSPs, being programmed to perform its functionality as described in this document by the processing unit executing program instructions of a computer program. To this end, the mobile computing device 150 may have computer program code 153*a* for an m-identification app, or similar program, stored in the memory 152 and executable by the controller 154 to perform the functionality for the thin-client mobile terminal MT as defined in this document. Alternatively, the controller 154 may be implemented as an FPGA, ASIC, etc. Even if not shown in FIG. 3, the mobile computing device 150 may comprise a user interface including a presentation device and an input device, much like the user interface 173 with its presentation device 175 and input device 177 of the computing device 170 in FIG. 4.

FIG. 4 illustrates a computing device 170 which may implement the thin-client service terminal ST as described herein. The computing device 170 comprises a controller 174, a short-range wireless communication interface 176, and a long-range broadband communication interface 178. The controller 174 is configured for performing the functionality defined for the thin-client service terminal ST in the communication system 100 as described herein, and/or the functionality defined for the thin-client service terminal ST in the method for performing mobile identification according to FIG. 6.

The computing device 170 illustrated in FIG. 4 may, for instance, be a tablet computer, laptop computer, mobile phone, desktop computer, personal digital assistant, smart glasses, smart watch, smart bracelet, service terminal apparatus, machine or vehicle. The controller 174 may be a processing unit in the form of, for instance, one or more CPUs and/or DSPs, being programmed to perform its functionality as described in this document by the processing unit executing program instructions of a computer program. To this end, the computing device 170 may have computer program code 173*a* for an m-identification app, or similar program, stored in the memory 172 and executable by the controller 174 to perform the functionality for the thin-client service terminal ST as defined in this document. Alternatively, the controller 174 may be implemented as an FPGA, ASIC, etc.

A server computing device 190, see FIGS. 1 and 2, may implement the remote system server resource SS as described herein and may hence be configured for performing the functionality defined for the remote system server resource SS in the communication system 100 as described herein, and/or the functionality defined for the thin remote system server resource SS in the method for performing mobile identification according to FIG. 6.

The server computing device 190 may, for instance, be a server computer, a cluster of such computer devices, or a cloud computing resource or service. It has a processing unit in the form of, for instance, one or more CPUs and/or DSPs, and is programmed to perform its functionality as described in this document by the processing unit executing program instructions of a computer program. The storage 192 may be a database included in or external to and operatively accessible to the server computing device 190.

Figure 5:
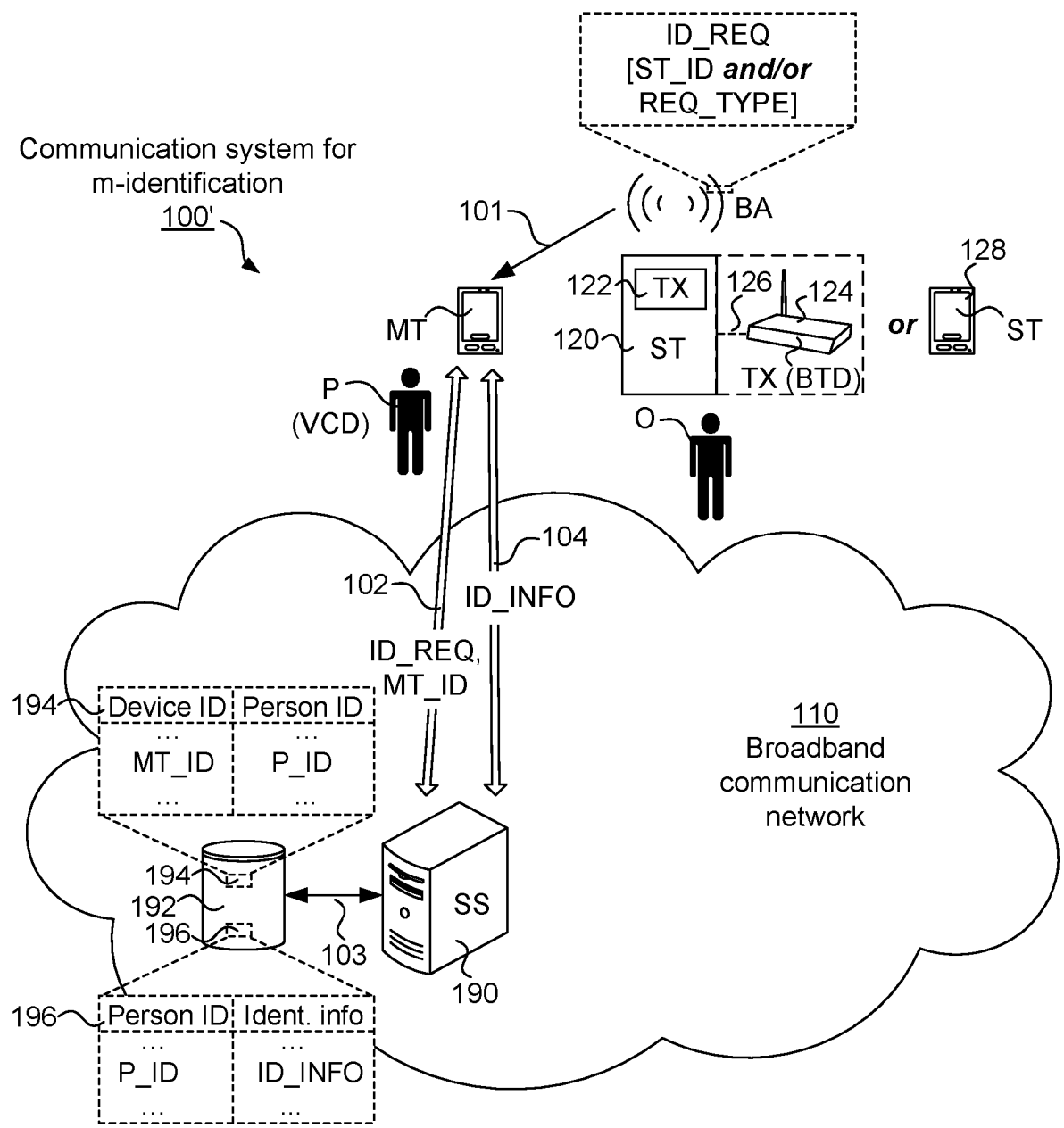
FIG. 5 illustrates an alternative communication system for performing mobile identification using thin client devices.

FIG. 5 illustrates an alternative communication system 100' configured for performing mobile identification using thin client devices. Devices MT, ST and remote server resource SS may be the same or substantially the same as has been described above for FIGS. 1-4. The difference is that the retrieved identification information ID_INFO is communicated (by long-range broadband data communication) to the thin-client mobile terminal MT instead of the thin-client service terminal ST by the remote server resource SS (or the additional remote server resource SS', SS").

In this alternative communication system 100', the retrieved identification information ID_INFO may be presented in a user interface of the mobile device MT, such as for instance on a display screen thereof. The user P of the thin-client mobile terminal MT may show the presented contents of the retrieved identification information ID_INFO to the operator O of the thin-client service terminal ST, who may verify the retrieved identification information ID_INFO by visual inspection.

This may be advantageous, inter alia, in situations where it is desired to activate more than one mobile terminal MT in the neighborhood of the service terminal ST. Possible use cases include, for instance, the checking of valid tickets at public transportation or events.

As can be seen in FIG. 5, the alternative communication system 100' comprises a thin-client mobile terminal MT having a device identity MT_ID, a thin-client service terminal ST, and a remote system server resource SS. The thin-client mobile terminal MT is configured for receiving 101 from the service terminal ST a short-range wireless communication signal BA representing an identification request ID_REQ, and in response communicating 102 with the remote server resource SS by long-range broadband data communication to report the identification request ID_REQ as well as the device identity MT_ID of the mobile terminal MT. The remote system server resource SS is configured for using the reported device identity MT_ID of the mobile terminal MT to retrieve 103 identification information ID_INFO about a human person P by accessing a storage 192, and causing communication 104 of the retrieved identification information ID_INFO to the thin-client mobile terminal MT by long-range broadband data communication.

The alternative communication system 100' in FIG. 5 may have any or all of the features of the dependent communication system claims as filed and attached to this description.

The alternative communication system 100' in FIG. 5 may have corresponding additional alternative inventive aspects in the form of a method, a mobile computing device (cf 150), a computing device (cf 170) and a server computing device (cf 190), as for the communication system 100 previously described.

Hence, for instance, a corresponding alternative method for the alternative communication system 100' in FIG. 5 is a method for performing mobile identification according to which a first step involves receiving by a thin-client mobile terminal MT from a thin-client service terminal ST a short-range wireless communication signal BA representing an identification request ID_REQ. This corresponds to 101 in FIGS. 1, 2 and 5, and is identical to step 310 in FIG. 6.

A second step of the corresponding alternative method in response involves communicating with a remote server resource SS by long-range broadband data communication to report the identification request ID_REQ as well as a device identity MT_ID of the mobile terminal MT. This corresponds to 102 in FIGS. 1, 2 and 5, and is identical to step 320 in FIG. 6.

A third step of the corresponding alternative method involves retrieving identification information ID_INFO about a human person P by accessing a storage 192 using the reported device identity MT_ID of the mobile terminal MT. This corresponds to 103 in FIGS. 1, 2 and 5, and is identical to step 330 in FIG. 6.

A fourth step of the corresponding alternative method involves causing communication of the retrieved identification information ID_INFO to the thin-client mobile terminal MT by long-range broadband data communication. The fourth step of the corresponding alternative method corresponds to 104/106 in FIGS. 1, 2 and 5 and to step 340 in FIG. 6, however with the difference that it causes communication of the retrieved identification information ID_INFO not to the service terminal ST but to the thin-client mobile terminal MT.

The method for performing mobile identification in FIG. 6 may additionally involve any of the functional features defined above for the different alternatives and embodiments of the communication system 100 according to FIG. 1 and/or FIG. 2.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A communication system comprising:
a thin-client mobile terminal having a device identity;
a thin-client service terminal having a user interface including a presentation device and an input device; and
a remote system server resource,
wherein the thin-client mobile terminal is configured for:
receiving, from the thin-client service terminal, a short-range wireless communication signal representing an identification request; and
in response communicating with the remote system server resource by long-range broadband data communication to report the identification request as well as the device identity of the thin-client mobile terminal;
wherein the remote system server resource is configured for:
using the reported device identity of the thin-client mobile terminal to retrieve identification information about a human person by accessing a storage; and
causing communication of the retrieved identification information to the thin-client service terminal by long-range broadband data communication;
wherein the thin-client service terminal is configured for:
receiving, by the input device, a user input from a user of the thin-client mobile terminal, wherein the user input comprises verification control data, and communicating the received verification control data to the remote system server resource by long-range broadband data communication; and
wherein the remote system server resource is further configured for:
causing verification of the received verification control data; and
causing communication of the retrieved identification information to the thin-client service terminal by long-range broadband data communication only when the verification is successful.

2. The communication system as defined in claim 1, wherein the storage contains a mapping between device identities and human person identities, and wherein the remote system server resource is configured for:
using the mapping to determine a person identity in the storage which matches the reported device identity of the thin-client mobile terminal; and
using the determined person identity to retrieve the identification information about the human person.

3. The communication system as defined in claim 2, wherein:
the storage is associated with the remote system server resource, the storage in addition to the mapping furthermore storing a data structure which contains identification information for various human persons, including the identification information about the human person; and wherein:
the remote system server resource is configured for retrieving the identification information about the human person by using the determined person identity for querying the data structure in the storage.

4. The communication system as defined in claim 2, wherein:
the storage is associated with the remote system server resource, the communication system furthermore comprising an additional remote server resource; and wherein:
the remote system server resource is configured for retrieving the identification information about the human person from the additional remote server resource using the determined person identity as retrieved from the storage.

5. The communication system as defined in claim 4, wherein:
the remote system server resource is configured for:
requesting the additional remote server resource to retrieve the identification information about the human person, the request including the determined person identity;
the additional remote server resource is configured for:
using the determined person identity to retrieve the identification information about the human person from a data structure associated with the additional remote server resource, and
responding to the remote system server resource by providing the retrieved identification information; and the remote system server resource is configured for:
communicating the provided identification information to the thin-client service terminal by long-range broadband data communication.

6. The communication system as defined in claim 4, wherein:
the remote system server resource is configured for:
requesting the additional remote server resource to retrieve the identification information about the human person, the request including the determined person identity; and
the additional remote server resource is configured for:
using the determined person identity to retrieve the identification information about the human person from a data structure associated with the additional remote server resource, and
communicating the retrieved identification information from the data structure to the thin-client service terminal by long-range broadband data communication.

7. The communication system as defined in claim 1, wherein the identification request represented by the short-range wireless communication signal from the thin-client service terminal contains an identity associated with the thin-client service terminal.

8. The communication system as defined in claim 1, wherein the identification request represented by the short-range wireless communication signal from the thin-client service terminal contains data specifying a type of identification requested.

9. The communication system as defined in claim 1, wherein:
the thin-client service terminal has a transmitter function in the form of a beacon transmitter device, the beacon transmitter device being included in or implemented by the thin-client service terminal itself, or being connected with the thin-client service terminal, or being located external to the thin-client service terminal; and wherein:
the beacon transmitter device is configured for repetitive transmission of a short-range wireless beacon signal that implements the short-range wireless communication signal which represents the identification request.

10. The communication system as defined in claim 9, wherein the thin-client mobile terminal is configured for:
storing, in a memory of the thin-client mobile terminal, one or more predefined service terminal identities; and
receiving said short-range wireless communication signal representing said identification request by monitoring for short-range wireless beacons signals containing any of the one or more predefined service terminal identities.

11. The communication system as defined in claim 9, wherein the beacon transmitter device is compliant with Bluetooth Low Energy, BLE.

12. The communication system as defined in claim 1, wherein the thin-client service terminal has a transmitter function for transmitting the short-range wireless communication signal representing the identification request as any of the following:
a near-field communication, NFC, signal,
a radio frequency identification, RFID, signal,
a Bluetooth signal,
a wireless LAN signal, or an LTE Direct signal.

13. The communication system as defined in claim 1, wherein communication by long-range broadband data communication involves encrypted/secure IP communication.

14. The communication system as defined in claim 1,
wherein the storage contains a mapping between device identities and human person identities,
wherein the remote system server resource is configured for:
using the mapping to determine a person identity in the storage which matches the reported device identity of the thin-client mobile terminal; and
using the determined person identity to retrieve the identification information about the human person, and
wherein the remote system server resource is configured for causing verification of the received verification control data by:
using the reported device identity associated with the thin-client mobile terminal or the determined person identity to retrieve verification reference data from a storage; and
causing comparison between the received verification control data and the retrieved verification reference data.

15. The communication system as defined in claim 1, wherein the remote system server resource or an additional remote server resource is configured for processing the reported identification request to determine what contents to retrieve and include in the identification information to be communicated to the thin-client service terminal.

16. A method for performing mobile identification, the method involving:
receiving, by a thin-client mobile terminal from a thin-client service terminal, a short-range wireless communication signal representing an identification request;
in response communicating with a remote system server resource by long-range broadband data communication to report the identification request as well as a device identity of the thin-client mobile terminal;
retrieving identification information about a human person by accessing a storage using the reported device identity of the thin-client mobile terminal; and
causing communication of the retrieved identification information to the thin-client service terminal by long-range broadband data communication;
by the thin-client service terminal:
receiving a user input from a user of the thin-client mobile terminal, wherein the user input comprises verification control data, and communicating the received verification control data to the remote system server resource by long-range broadband data communication; and
by the remote system server resource:
causing verification of the received verification control data, and
causing communication of the retrieved identification information to the thin-client service terminal by long-range broadband data communication only when the verification is successful.

17. The method as defined in claim 16, further comprising:
processing, by the remote system server resource, the reported identification request to determine what contents to retrieve and include in the identification information to be communicated to the thin-client service terminal.

18. The method as defined in claim 16, further comprising:
processing, by an additional remote server resource, the reported identification request to determine what contents to retrieve and include in the identification information to be communicated to the thin-client service terminal.

19. A communication system comprising:
a thin-client mobile terminal, the thin-client mobile terminal having a device identity and a user interface including a presentation device and an input device;
a thin-client service terminal; and
a remote system server resource, wherein the thin-client mobile terminal is configured for:
  receiving, from the thin-client service terminal, a short-range wireless communication signal representing an identification request; and
  in response communicating with the remote system server resource by long-range broadband data communication to report the identification request as well as the device identity of the thin-client mobile terminal;
wherein the remote system server resource is configured for:
  using the reported device identity of the thin-client mobile terminal to retrieve identification information about a human person by accessing a storage; and
  causing communication of the retrieved identification information to the thin-client service terminal by long-range broadband data communication;
wherein the thin-client mobile terminal is further configured, after having received the short-range wireless communication signal, for:
  receiving an entry from a user of the thin-client mobile terminal, wherein the entry comprises verification control data, and
  communicating the received verification control data to the remote system server resource by long-range broadband data communication; and
wherein the remote system server resource is further configured for:
  causing verification of the received verification control data; and
  causing communication of the retrieved identification information to the thin-client service terminal by long-range broadband data communication only when the verification is successful.

20. The communication system as defined in claim 19, wherein the storage contains a mapping between device identities and human person identities,
wherein the remote system server resource is configured for:
  using the mapping to determine a person identity in the storage which matches the reported device identity of the thin-client mobile terminal; and
  using the determined person identity to retrieve the identification information about the human person, and
wherein the remote system server resource is configured for causing verification of the received verification control data by:
  using the reported device identity associated with the thin-client mobile terminal or the determined person identity to retrieve verification reference data from the storage; and
  causing comparison between the received verification control data and the retrieved verification reference data.

21. The communication system as defined in claim 20, wherein:
the storage is associated with the remote system server resource, the storage in addition to the mapping furthermore storing a data structure which contains identification information for various human persons, including the identification information about the human person; and wherein:
the remote system server resource is configured for retrieving the identification information about the human person by using the determined person identity for querying the data structure in the storage.

22. The communication system as defined in claim 20, wherein:
the storage is associated with the remote system server resource, the communication system furthermore comprising an additional remote server resource; and wherein:
the remote system server resource is configured for retrieving the identification information about the human person from said additional remote server resource using the determined person identity as retrieved from the storage.

23. The communication system as defined in claim 22, wherein:
the remote system server resource is configured for:
  requesting the additional remote server resource to retrieve the identification information about the human person, the request including the determined person identity;
the additional remote server resource is configured for:
  using the determined person identity to retrieve the identification information about the human person from a data structure associated with the additional remote server resource, and
  responding to the remote system server resource by providing the retrieved identification information about the human person from the data structure; and
the remote system server resource is configured for:
  communicating the provided identification information about the human person to the thin-client service terminal by long-range broadband data communication.

24. The communication system as defined in claim 22, wherein:
the remote system server resource is configured for:
  requesting the additional remote server resource to retrieve the identification information about the human person, the request including the determined person identity; and
the additional remote server resource is configured for:
  using the determined person identity to retrieve the identification information about the human person from a data structure associated with the additional remote server resource, and
  communicating the retrieved identification information from the data structure to the thin-client service terminal by long-range broadband data communication.

25. The communication system as defined in claim 19, wherein the identification request represented by the short-range wireless communication signal from the thin-client service terminal contains an identity associated with the thin-client service terminal.

26. The communication system as defined in claim 19, wherein the identification request represented by the short-range wireless communication signal from the thin-client service terminal contains data specifying a type of identification requested.

27. The communication system as defined in claim 19, wherein:
the thin-client service terminal has a transmitter function in the form of a beacon transmitter device, the beacon transmitter device being included in or implemented by the thin-client service terminal itself, or being connected with the thin-client service terminal, or being located external to the thin-client service terminal; and wherein:
the beacon transmitter device is configured for repetitive transmission of a short-range wireless beacon signal that implements the short-range wireless communication signal which represents the identification request.

28. The communication system as defined in claim 27, wherein the thin-client mobile terminal is configured for:
storing, in a memory of the thin-client mobile terminal, one or more predefined service terminal identities; and
receiving said short-range wireless communication signal representing said identification request by monitoring for short-range wireless beacons signals containing any of the one or more predefined service terminal identities.

29. The communication system as defined in claim 27, wherein the beacon transmitter device is compliant with Bluetooth Low Energy, BLE.

30. The communication system as defined in claim 19, wherein the thin-client service terminal has a transmitter function for transmitting the short-range wireless communication signal representing the identification request as any of the following:
a near-field communication, NFC, signal,
a radio frequency identification, RFID, signal,
a Bluetooth signal,
a wireless LAN signal, or an LTE Direct signal.

31. The communication system as defined in claim 19, wherein communication by long-range broadband data communication involves encrypted/secure IP communication.

32. A method for performing mobile identification, the method involving:
receiving, by a thin-client mobile terminal from a thin-client service terminal, a short-range wireless communication signal representing an identification request;
in response communicating with a remote system server resource by long-range broadband data communication to report the identification request as well as a device identity of the thin-client mobile terminal;
retrieving identification information about a human person by accessing a storage using the reported device identity of the thin-client mobile terminal;
causing communication of the retrieved identification information to the thin-client service terminal by long-range broadband data communication;
by the thin-client mobile terminal, after having received the short-range wireless communication signal:
receiving an entry from a user of the thin-client mobile terminal, wherein the entry comprises verification control data, and
communicating the received verification control data to the remote system server resource by long-range broadband data communication; and
by the remote system server resource:
causing verification of the received verification control data; and
causing communication of the retrieved identification information to the thin-client service terminal by long-range broadband data communication only when the verification is successful.

33. The method as defined in claim 32, further comprising:
processing, by the remote system server resource, the reported identification request to determine what contents to retrieve and include in the identification information to be communicated to the thin-client service terminal.

34. The method as defined in claim 32, further comprising:
processing, by an additional remote server resource, the reported identification request to determine what contents to retrieve and include in the identification information to be communicated to the thin-client service terminal.

* * * * *